April 8, 1958 K. McCORMICK 2,829,637
HEART BEAT INDICATOR
Filed Oct. 27, 1955
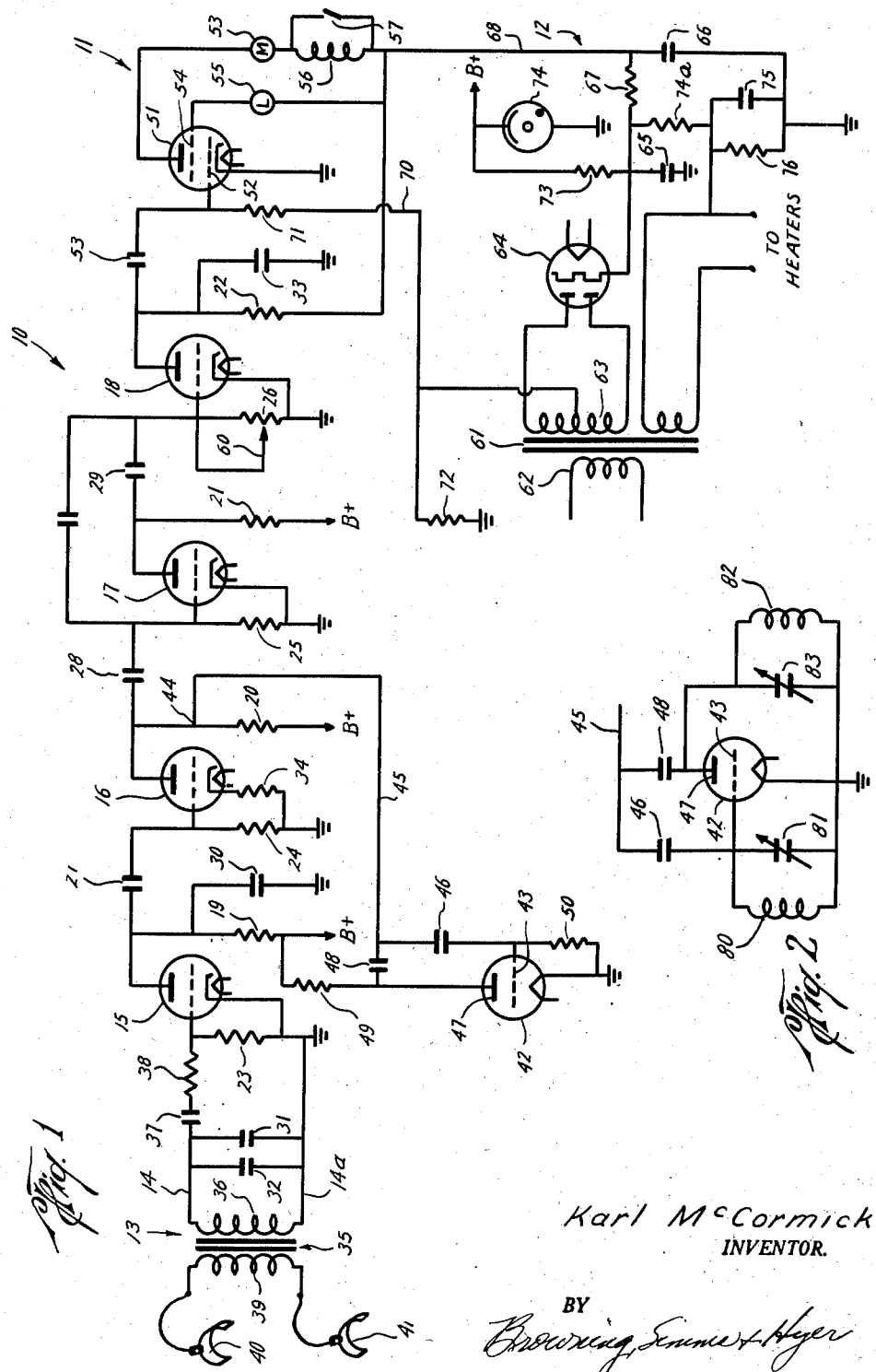
Karl McCormick
INVENTOR.

United States Patent Office 2,829,637
Patented Apr. 8, 1958

2,829,637

HEART BEAT INDICATOR

Karl McCormick, Houston, Tex., assignor to W. F. Wilson, Houston, Tex.

Application October 27, 1955, Serial No. 543,227

16 Claims. (Cl. 128—2.05)

This invention relates to electrical apparatus adapted to amplify an electrical impulse generated by the beating of a heart and to emit a perceptible signal each time and only each time the heart beats. In one of its aspects, it relates to such an apparatus in which stray or interfering frequencies are prevented from causing false indications of heart beats so that the apparatus has an output signal generated responsive only to a preselected frequency of the order of that produced by a beating heart. In another of its aspects, the invention relates to a circuit for substantially reducing or eliminating undesired or stray frequencies from an amplifier or other circuit.

The invention of this application is an improvement upon the invention of my co-pending application Serial No. 392,605, filed November 17, 1953.

As pointed out in my co-pending application, one problem which has faced the medical profession for some time is to quickly detect a cardiac arrest of a patient in order that steps may be taken to restore the heart to beating before serious impairment of certain body organs occurs. Also, it is desirable to have some means for perceptibly indicating each time the heart beats, with positive assurance that the signal will always be emitted when the heart beats and never will be emitted in the absence of a heart beat.

Various circuits have been suggested in the past to detect the beating of a heart, but they have been primarily deficient in that they would give a false signal or in not giving a signal when they should. For example, one of the principal problems encountered in devising such circuits is to eliminate stray currents of undesired frequencies. Thus, such circuits tend to pick up stray 60-cycle current either from a 60-cycle power source therefor or from other sources which couple into the circuit. Since the potential generated by the heart is of low amplitude and of relatively low frequency, as compared with stray 60-cycle current, and since considerable amplification thereof is desired in order to properly generate a perceptible signal, it can be seen that any stray 60-cycle currents which flow in the amplifier could easily be amplified to an extent such that they in themselves would cause signals to be emitted or even to block the amplifier. Such a deficiency is fatal to the accurate operation of a heartbeat indicating circuit since the latter must be responsive solely to potentials generated by the beating heart.

Another problem encountered is that of providing a suitable means for picking up the heat-beat potential and feeding it into an amplifier in such a manner that the signal is not altered by a person or instrument touching the patient. For example, when a pair of electrodes are connected to the patient with one electrode connected to ground while the other is either directly or capacity coupled to the amplifier, a conductive person touching the patient tends to tap off some of the skin resistance and thereby vary the signal being sent to the amplifier. If the tap to ground is sufficiently good, very little of the signal may be sent to the amplifier, thereby possibly giving a false indication of a cardiac arrest.

It is, accordingly, one of the objects of this invention to provide an apparatus for indicating the beating of a heart which apparatus will positively emit a perceptible signal each time the heart beats and will cease emitting such signals upon cessation of the heart beat and which will not give false signals because of stray currents.

Another object of this invention is to provide a new and improved heat-beat indicating apparatus arranged so that grounding of the patient will not interfere with the proper functioning of the apparatus.

Another object of the invention is to provide such an apparatus wherein undesired currents will not be amplified to an extent such that they will cause a false signal to be emitted or block the amplifier, the stray currents being reduced or eliminated by a new and novel circuit for such purpose.

Another object of the invention is to provide a circuit capable of substantially reducing or eliminating currents of undesired frequencies from an amplifier or other circuit without substantially interfering with a current or current of desired frequency which is to be amplified or is otherwise flowing in a circuit.

Other objects, advantages and features of this invention will become more apparent to one skilled in the art upon a consideration of the written specification, the appended claims and the attached drawings wherein:

Fig. 1 represents a schematic diagram of a preferred circuit embodying the invention; and Fig. 2 is a schematic diagram of an alternative embodiment of a circuit for substantially reducing or eliminating currents of undesired frequency from an amplifier or other circuit.

The major components of the apparatus illustrated in the drawings include an amplification means, designated generally by the numeral 10, arranged to amplify a signal potential generated by the heart while eliminating from its output frequencies other than those of the input wave generated by the heart. Also included is an indicating circuit 11 connected to the output of the amplification means and arranged in such a manner that a signal emitter therein is both energized and de-energized responsive to the instantaneous voltage of the output of the amplification means respectively rising above and falling below a predetermined value. Also, there is provided a power supply 12 and an input circuit 13, the latter being adapted for connection to a patient whose heart beat is to be indicated.

The amplification means is illustrated as a four-stage, resistance-capacitance coupled, high-gain amplifier having an input adapted to be supplied with a signal potential wave generated by the heart. The electrical potential applied to the amplifier input terminals 14 and 14a is amplified by the four triodes 15, 16, 17 and 18 which may be conveniently paired into two envelopes. The stages of the amplifier are coupled together by load resistors 19, 20, 21 and 22, grid resistors 23, 24, 25 and 26 and coupling condensers 27, 28 and 29.

To aid in the attenuation of interfering higher frequencies, such as those of stray 60-cycle currents, so that the amplifier output can predominate in the lower frequencies generated by the heart, by-pass condensers 30, 31, 32 and 33 can be connected to ground to shunt the higher frequencies.

In the preferred arrangement of the amplifier circuit, tubes 15 to 18 are operated as class "A" amplifiers. Thus, load resistance 19 of tube 15 is made to be considerably higher in value than usual so that the cathode-to-plate potential is relatively low. The plate then operates with sufficient negative bias on the grid that its operation is class "A." For tube 16, cathode resistance 34 gives the desired bias. Tubes 17 and 18 are of the zero-bias type.

The input circuit to the amplifier includes a transformer 35 having the high side of its secondary 36 connected via a blocking condenser 37 and resistance 38 to the grid of the first tube of the amplifier. The low side of the secondary is connected to ground. The primary 39 of the transformer is ungrounded and has one of its ends connected to an electrode 40 and its other to an electrode 41. These electrodes are adapted to be connected to the patient whose heart beat is to be signalled, such as to the wrists or to a wrist and the opposite ankle of the patient's body. Thus the circuit from electrode 40 through primary 39 to electrode 41 is not grounded. With this arrangement, the patient can be grounded without interfering or altering the signal fed to the amplifier in a manner as would interfere with the operation of the heart-beat indicating circuit of this invention. For example, a doctor touching the patient does not act to effectively tap off to ground part of the skin resistance between the electrodes on the patient. This avoids erratic changes in input to the amplifier circuit since none of the signal is passed to ground and hence the input is dependent only upon the heart beat characteristics of the patient rather than whether or not he is grounded. It also avoids general upsetting of the static conditions due to variation in signal, which in turn would cause variation in the reference point of the QRS complex input voltage wave above ground.

It will be noted that condensers 31 and 32 give a tuned, or semi-tuned, transformer secondary which aids in increasing the gain.

As more fully set forth in my co-pending application, it is possible by properly balancing the components of the amplifier, to filter out a large portion of the higher frequency currents and to give an adequate amplification of the desired signal in a four-stage amplifier. To further aid in achieving such objective and to assure adequate removal of interfering currents, a novel means is provided for relucing flow of current of undesired frequency through the amplifier. Such means includes a phase-shifting means coupled to the amplifier or other circuit in such a manner that sufficient of the current of undesired frequency has its phase shifted by such means that it will cause substantially all of the current of undesired frequency to be cancelled out. On the other hand, the current of desired frequency is prevented from likewise being cancelled out by discriminating against its flow to the phase shifting means. Thus, for example, the phase shifting means can comprise a triode vacuum tube 42, having its output substantially 180° out of phase with its input. The input to grid 43 is taken from a point in the amplifier 10 where there exists currents of both desired and undesired frequencies. Such point should be selected desirably to be just before the amplifier stage which is most apt to be blocked by the current of undesired frequency. In any event, such point is connected by a wire 45 to grid 43 and has an impedance in it, here shown as a capacitance 46, of relatively high value with respect to the desired frequency and of low value with respect to the undesired frequency. This permits the voltage of undesired frequency to be relatively freely impressed upon control grid 43 while voltage of the desired frequency is not substantially so impressed. Plate 47 of tube 42 is connected to the input circuit to the tube so that the alternating current flowing in the output, which is 180° out of phase with alternating current in the input, tends to cancel out the current of undesired frequency flowing in the amplifier 10. A coupling condenser 48 couples the plate with the input circuit while the plate circuit of tube 42 is connected through a load resistor 49 to the B supply. A resistor 50 is connected from grid 43 to ground and may be formed to act as a choke to maintain the undesired frequency, when higher than the desired frequency, on the grid while filtering off the desired frequency which may pass through capacitance 46.

The gain of tube 42 should be such that the amplitude of its output is substantially equal to that of current of undesired frequency flowing at point 44 whereby the amplified output will substantially cancel out current of the undesired frequency. It will thus be seen that there is provided essentially a means for shifting the phase of the undesired current substantially 180° while feeding back sufficient of the phase-shifted current into the main circuit to cause cancellation of the current of undesired frequency therein, such means also being made selective so that substantially only the current of undesired frequency is so phase-shifted and fed back while a minimum of current of desired frequency is so treated. As a result, there is a selective cancellation of current in the main circuit.

The output of the amplification means is applied to an indicating circuit arranged in such a manner that each time the amplitude of the output exceeds a predetermined magnitude, a perceptible signal is emitted and when the output decreases below such predetermined magnitude, the signal is cut off. Thus, a current controlling means such as a tetrode 51 is provided with its control grid 52 connected to the output of the amplifier through a blocking condenser 53. Disposed in the plate circuit of tube 51 is an indicating means or signal means which is shown in the form of a milliammeter 53. Another grid 54 of the tetrode is connected in series with a light source, such as a neon tube 55, and thence to ground. By placing the neon tube thusly in the screen grid circuit instead of in the plate circuit, it is possible to increase the apparent gain of the over-all circuit.

If desired, a clicker relay 56 can be placed in the plate circuit to emit a sound signal. A by-pass switch 57 is placed around the relay to render it operative and inoperative as desired.

With this arrangement, each time current flows in the plate circuit, the milliammeter hand will reflect such flow of current and hence the beating of the heart. Also, when the voltage across the screen grid circuit is above a predetermined value, the neon tube will fire but will be extinguished under the control of tube 51. In order to positively assure that a signal is emitted only upon the occurrence of an R peak in the QRS wave of the beat, grid 52 of tube 51 is biased with a suitable potential such that the tube, in the absence of an input signal thereto of predetermined magnitude, is biased to cut off or so close to cut off that current flowing therethrough is insufficient to cause any of the signaling means 53, 55, or 56 to emit a perceptible signal. Then upon a positive pulse from the output of the amplifier being applied to the grid, it will be driven more positive so that tube 51 conduits current to energize the signaling means. As soon as the amplifier output swings back to permit the grid to again assume cutoff potential, tube 51 will cease conducting. In this manner, the conduction of current by tube 51 and the cessation of current flow therethrough is under the complete control of the output of the amplifier and tube 51 will not conduct current until an output signal from the amplifier is applied thereto and then only when such output signal is of a predetermined amplitude, i. e., during the interval when the R peak has an instantaneous voltage exceeding a predetermined value. In other words, tube 51 is rendered conductive only during the time a voltage peak of predetermined magnitude appears in the amplifier output. At all other times, the circuits can lie at rest without any of the emitter means giving a perceptible signal. Thus, in case of cardiac arrest, tube 51 cannot be self-excited or otherwise be made to conduct sufficient current to give a false signal of heart beat.

Since the R peak of various patients will vary in maximum amplitude from patient to patient, it is desirable to control the gain of the amplifier so that signals will be emitted only during the time when the heart of a particular patient is beating with a predetermined strength. Thus, it has been found that with some patients, the amplitude of the generated heart wave may be as much as 1½ millivolts while for other patients it may not exceed ½ millivolt. To so control the gain, resistance 26 is made variable by connecting a movable tap 60 therefor to the grid of tube 18. Then by adjusting resistance 26 toward the maximum effective value thereof, the voltage drop across condenser 29 is decreased to thereby increase the voltage drop across floating resistor 21 and, hence, to make the amplitude of the signal fed into tube 18 a maximum. Decreasing the effective value of resistance 26 has the opposite effect.

While any suitable power supply for the above-described circuit can be provided, a typical one is shown in Fig. 1. It comprises a transformer 61 having a primary connectible to a 110 volt source. The secondary 63 of the transformer is center-tapped and has its ends connected to a full wave rectifier 64. The rectifier is connected to the capacitances 65 and 66 and the resistance 67 arranged in a filter network to smooth the output of the rectifier. The plate circuit of tube 51 is completed by connecting a wire 68 from the filter network to the plate so that a suitable D. C. potential is applied across this tube. In order to bias tube 51 to cut-off, as explained above, wire 70 having a grid resistance 71 therein is connected from the grid of the tube to the center tap of the power supply and dropping resistance 72 is connected between the center tap and the low side of the filter network. The high side of the filter is connected through resistance 73 to the plates of the various amplifier tubes. Voltage regulator tube 74 is connected to by-pass ripple current to ground. The low side of the filter network is grounded so as to complete the plate cathode circuit of the various tubes.

In order to prevent alternating current from flowing from the heaters to the cathodes of the various tubes, the heaters are given a positive potential with respect to the cathodes by connecting resistance 74a between the high side of the D. C. power supply and a lead of the heater supply. Capacitance 75 and resistance 76 complete this biasing circuit.

An alternative embodiment of the means for canceling undesired frequency from a circuit is shown in Fig. 2. This particular embodiment exemplifies the use of such means for operation at higher frequencies, such as radio frequencies. Many of the elements function similarly to those described with respect to Fig. 1 and will not be described further here. However, a parallel tuned circuit comprising an inductance 80 and a capacitance 81, is connected between grid 43 and ground. This circuit is tuned to the undesired frequency so that it presents a very high impedance to current having the undesired frequency whereby the signal in the form of such current is applied to grid 43 at a miximum value. On the other hand, the tuning should be sufficiently sharp that the tuned circuit has a relatively low impedance to current of the desired frequency which may otherwise be impressed upon grid 43. Hence, by so filtering out current of desired frequency, the output of tube 42 will contain very little, if any, thereof. To further prevent amplification of current of desired frequency, another tuned circuit comprising inductance 82 and capacitance 83 is connected between the output of tube 42 and ground. It too is tuned to the undesired frequency thereby forcing the feeding of the shifted phase undesired frequency back through wire 45 while permitting any phase-shifted current of desired frequency to flow to ground.

The operation of the heart beat indicating circuit as above-described is believed to be apparent, but a short description will be given to insure a full disclosure. Thus, electrodes 40 and 41 can be connected to the patient and each time the heart beats, a QRS complex wave will be fed into the four-stage amplifier via the coupling transformer 13. This input is amplified until there is an output of sufficient amplitude to render tube 51 conducting each time an amplifier R wave is fed thereto. As soon as the instantaneous voltage of the amplified R wave exceeds a predetermined value, tube 51 starts to conduct and thereby energizes light 55 and milliammeter 53. This energization continues during both the rise of the amplified R wave to its peak and its falling off back to the predetermined value. Thereupon, tube 51 is immediately rendered nonconducting and the signal stopped. In effect then, tube 51 is rendered conducting only during certain pre-selected peaks of output voltage from the amplifier.

Stray 60-cycle currents in the amplifier may be amplified to a point where they can easily cause tube 51 to be rendered conducting or to the point where they may block one or more tubes of the amplifier. This is prevented not only by the various by-passing capacitances but also by tube 42, which feeds back enough of reverse phase current of undesired frequency to cancel such current from the circuit. If desired, such phase-shifting circuits can be connected in combination with each of the amplifier tubes so that the output of the amplifier is very pure in current of desired frequency.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An apparatus for emitting a perceptible signal each time a heart beats comprising, in combination, an amplifier constructed to amplify frequencies of the order of one of the potential waves generated by the heart, a coupling transformer having its secondary connected to the input of the amplifier and having an ungrounded primary, a pair of electrodes adapted to be placed in contact with a human body to pick up said potential waves and connected respectively to opposite ends of said primary, means adapted to emit a signal responsive to current flow therethrough, a normally non-conducting device in circuit with said signal means and connected to the output of the amplifier, said device being rendered conductive while the output signal voltage wave of said amplifier has an instantaneous voltage in excess of a predetermined positive value and non-conductive-responsive to said instantaneous voltage falling below said positive value whereby current flow through the signal means is in pulses in synchronism with the beating of the heart.

2. An apparatus for emitting a perceptible signal each time a heart beats comprising, in combination, amplification means constructed to amplify frequencies of the order of one of the potential waves generated by the heart and to discriminate against frequencies of other magnitude; a circuit connected to the output of the amplification means including means for emitting a perceptible signal responsive to current flow of predetermined magnitude in said circuit, said circuit also including a device which, upon the instantaneous output voltage of the amplification means exceeding a predetermined value, permits current of at least said predetermined magnitude to flow in said circuit and, upon said instantaneous voltage falling below said predetermined value, causing current flow in said circuit to fall below said predetermined magnitude whereby the period of current flow in said circuit in excess of said predetermined magnitude is coextensive with and dependent upon the period of said instantaneous voltage exceeds said predetermined value; a coupling transformer having its secondary connected to the input of said amplification means and having an ungrounded primary; and a pair of electrodes adapted to be placed in contact with a human body to pick up said potential waves and connected respectively to opposite ends of said primary whereby grounding of said body does not alter the potential waves being passed through said amplification means.

3. The apparatus of claim 2 wherein said device includes a vacuum tube having its plate and cathode connected in series in said circuit and its control grid connected to the output of the amplification means, and means providing sufficient negative bias to said tube to render it non-conductive while said instantaneous voltage is less than said predetermined value.

4. The apparatus of claim 3 wherein said tube includes a second grid and a second circuit connecting said second grid to said cathode, said signal-emitting means being in said second circuit and operative responsive to current flow therein.

5. The apparatus of claim 4 in combination with means for reducing the amount of current of undesired frequency flowing through said amplification means, said undesired frequency being of a different value from that of current desired to be amplified, said reducing means including a device having an output signal substantially 180° out of phase with an input signal thereto, an input circuit between the input to said device and said amplification means and having a high impedance in respect of said desired frequency and a low impedance in respect of said undesired frequency, and non-phase-shifting means coupling the output of the device to said input circuit.

6. An apparatus for emitting a perceptible signal each time a heart beats comprising, in combination, amplification means constructed to amplify frequencies of the order of one of the potential waves generated by the heart and to discriminate against frequencies of other magnitudes; a signaling circuit connected to the output of the amplification means including means for emitting a perceptible signal responsive to current flow in said signaling circuit, means in said signaling circuit normally limiting current flow therein to be less than that required to cause the signal-emitting means to emit a signal but permitting sufficient current to flow in the signaling circuit to cause emission of a signal responsive to each voltage peak in the output of the amplification means being of at least a predetermined magnitude; a coupling transformer having its secondary connected to the input of the amplification means and having an ungrounded primary; and a pair of electrodes respectively connected to opposite ends of said primary and each adapted to be placed in electrical contact with portions of a human body to pick up the potential waves generated by the beating of a heart whereby such waves can be fed to the amplification means and grounding of the human body connected to the electrodes does not alter the potential waves being so fed.

7. An apparatus for emitting a perceptible signal each time a heat beats comprising, in combination, amplification means constructed and arranged to amplify a desired frequency of the order of one of the potential waves generated by the heart; means for supplying said amplification means with an electric potential generated by the heart; means connected to the output of the amplification means for emitting a signal each time a voltage peak of predetermined magnitude occurs in the output of the amplification means; and means for reducing flow of current of undesired frequency through said amplification means including phase-shifting means having an output substantially 180° out of phase with its input, means providing a relatively low impedance with respect to said undesired frequency and a relatively high impedance with respect to said desired frequency and connecting the input of said phase-shifting means to a point in said amplification means where both the undesired and desired frequencies exist, and a non-phase-shifting circuit connecting the output of the phase-shifting means to its input whereby the undesired frequencies tend to cancel each other.

8. The apparatus of claim 7 wherein said phase-shifting means is an amplifier having a gain sufficient that its output is of a magnitude as to be substantially equal to that of current of undesired frequency flowing in said amplification means.

9. An apparatus for emitting a perceptible signal each time a heart beats comprising, in combination, amplification means constructed and arranged to amplify a desired frequency of the order of one of the potential waves generated by the heart; means for supplying said amplification means with electric potentials generated by the heart; means connected to the output of the amplification means for emitting a signal each time a voltage peak of predetermined magnitude occurs in the output of the amplification means; and means for reducing flow of current of undesired frequency through said amplification means including a vacuum tube, a circuit connecting the control grid of the vacuum tube to a point in the amplification means where currents of both desired and undesired frequencies are flowing, a capacitance in said circuit providing a high impedance in respect of the desired frequency and a low impedance in respect of the undesired frequency, and a second circuit including a blocking capacitance connecting the plate circuit of said tube with one of the first-mentioned circuit and said amplification means so that the amplified signal in said second circuit tends to cancel out the undesired frequency in said amplification circuit.

10. The apparatus of claim 9 wherein said tube has a gain sufficient that the amplitude of its output is substantially equal to the amplitude of the current of undesired frequency flowing in said amplification means.

11. In an amplification circuit wherein it is desired to amplify a signal having a desired frequency and to limit amplification of a signal having an undesired frequency different from the desired frequency, an amplifier having an output of substantially opposite phase with respect to its input, a first circuit having a relatively low impedance in respect of the undesired frequency and a relatively high impedance in respect of the desired frequency and connecting the input of the amplifier to a point in the amplification circuit where the undesired frequency exists, a non-phase-shifting second circuit connecting the output of the amplifier to one of said first circuit and said amplification circuit, said amplifier having sufficient gain that the amplitude of its output substantially equals that of the undesired frequency flowing in said amplification circuit so that the undesired frequencies substantially cancel each other, and a shunt having a relatively low impedance in respect of said desired frequency and a relatively high impedance in respect of said undesired frequency and connecting the first circuit to ground to shunt current of the desired frequency passing through the impedance in said first circuit, from the amplifier.

12. In an amplification circuit wherein it is desired to amplify a signal having a desired frequency and to limit amplification of a signal of an undesired frequency different from the desired frequency, an amplifier having at least one stage, and having phase shifting elements consisting only of those which have an output 180 degrees out of phase with their input whereby the output of the amplifier has a phase relationship with its input of $n(180)$ degrees where $n$ is a whole number, circuit means connecting the input of the amplifier to a point in the amplification circuit where the undesired frequency exists and also connecting the output of the amplifier to a point in the amplification circuit where the undesired frequency is opposite in phase to the output of the amplifier, the circuit means in its connection to the amplifier input having a relatively low impedance in respect of the desired frequency and a relatively high impedance in respect of the desired frequency, said circuit means in its connection between the amplifier output and the last-mentioned point in the amplification circuit having a lumped impedance consisting essentially only of one of capacitance, resistance and inductance and being free from any two of such impedances connected in series thereby avoiding phase shifting the amplifier output such as would cause unwanted oscillations, said amplifier having sufficient gain that the amplitude of its output substantially equals that of the undesired frequency flowing in said amplification circuit so that the undesired frequencies substantially cancel each other.

13. The circuit of claim 11 in combination with a shunt having a low impedance in respect of the desired frequency and a high impedance in respect of the undesired frequency and connected to the output of the amplifier to shunt current of desired frequency therefrom so that substantially only current of the undesired frequency is fed to the amplification means for canceling current flowing therein.

14. The circuit of claim 11 in combination with a parallel tuned circuit in the output of the amplifier tuned to the undesired frequency to reduce the amount of cancellation of current of desired frequency.

15. An apparatus for emitting a perceptible signal each time a heart beats comprising, in combination, amplification means constructed to amplify frequencies of the order of one of the potential waves generated by the heart; a circuit connected to the output of the amplification means including means for emitting a perceptible signal responsive to current flow of predetermined magnitude in said circuit; a coupling transformer having its secondary connected to the input of said amplification means and having an ungrounded primary; and a pair of electrodes adapted to be placed in contact with a human body to pick up said potential waves and connected respectively to opposite ends of said primary whereby grounding of said body does not alter the potential waves being passed through said amplification means.

16. An apparatus for emitting a perceptible signal each time a heart beats comprising, in combination, amplification means constructed and arranged to amplify a desired frequency of the order of one of the potential waves generated by the heart; means for supplying said amplification means with an electric potential generated by the heart; means connected to the output of the amplification means for emitting a signal each time a voltage peak of predetermined magnitude occurs in the output of the amplification means; and means for reducing flow of current of undesired frequency through said amplification means including a phase shifting amplifier circuit having an input connected to a point in the amplification means where said undesired frequency exists and an output connected to a point in the amplification means where undesired frequency is opposite in phase to the frequency of amplifier circuit output, and means in said amplifier circuit causing the undesired frequency to be selectively amplified in respect of the desired frequency whereby the output of the amplifier circuit tends to cancel the undesired frequency in said amplification means.

References Cited in the file of this patent

UNITED STATES PATENTS

| | | |
|---|---|---|
| 2,438,217 | Johnson | Mar. 23, 1948 |
| 2,439,495 | Sturm | Apr. 13, 1948 |